US006936358B2

(12) United States Patent
Kume et al.

(10) Patent No.: US 6,936,358 B2
(45) Date of Patent: Aug. 30, 2005

(54) LASER BEAM WRITING MATERIAL, MATERIAL FOR FORMING THE SAME, AND DISPLAY BODY

(75) Inventors: Katsuya Kume, Ibaraki (JP); Katsuyuki Okazaki, Ibaraki (JP); Makoto Kai, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/270,600

(22) Filed: Oct. 16, 2002

(65) Prior Publication Data

US 2003/0082413 A1 May 1, 2003

(30) Foreign Application Priority Data

Oct. 25, 2001 (JP) .................................... P2001-327147

(51) Int. Cl.$^7$ ................................................ B32B 9/00

(52) U.S. Cl. .................... 428/702; 428/543; 428/913.3

(58) Field of Search ................................ 428/702, 543, 428/913.3, 913, 195, 914

(56) References Cited

U.S. PATENT DOCUMENTS 5,780,142 A * 7/1998 Kume et al. ............ 428/195.1
5,855,969 A 1/1999 Robertson
6,416,845 B1 * 7/2002 Kume et al. ............... 428/32.5

FOREIGN PATENT DOCUMENTS

JP 2000226248 * 8/2000

* cited by examiner

*Primary Examiner*—Cheryl A. Juska
*Assistant Examiner*—Arden B. Sperty
(74) *Attorney, Agent, or Firm*—Sughrue Mion, PLLC

(57) ABSTRACT

A laser beam writing material having: silicon dioxide; and a titanium-containing compound fixed with the silicon dioxide and capable of being changed in color by irradiation with a laser beam; wherein when a color-changed portion in the laser beam writing material is formed by irradiation with the laser beam and exposed to the air at 600° C. for 30 minutes, contrast between the color-changed portion and a color-unchanged portion in the laser beam writing material is not lower than 0.60; a material for forming the laser beam writing material, having a mixture at least including the titanium-containing compound and an MQ resin; and a display body having a color-changed portion formed by irradiation with the laser beam in the laser beam writing material.

8 Claims, No Drawings

LASER BEAM WRITING MATERIAL, MATERIAL FOR FORMING THE SAME, AND DISPLAY BODY

FIELD OF THE INVENTION

The present invention relates to a laser beam writing material in which a pattern excellent in contrast can be formed by irradiation with a laser beam and which is adapted for forming a display body such as a management label excellent in heat resistance, weather resistance, etc.; and a material for forming the laser beam writing material.

BACKGROUND OF THE INVENTION

There has been a demand for a material which is excellent in heat resistance, weather resistance, etc. and which can be used as a management label for a commodity made of a metal, ceramics or the like and subjected to a heat-treating process. Heretofore, various kinds of organic materials such as polymers had been known as materials writable by irradiation with a laser beam, that is, as laser beam writing materials. This type laser beam writing material was, however, formed so that an organic material was carbonized by irradiation with a laser beam to thereby form a pattern. There was a problem that this type laser beam writing material was poor in heat resistance.

On the other hand, there had been known a laser beam writing material of the paint form in which the shape of titanium oxide was retained by a silicone binder, and a laser beam writing material of the paint form in which the shape of titanium oxide was retained by a low-melting glass binder (U.S. Pat. No. 5,855,969). The former using titanium oxide was inferior in weather resistance because the silicone binder was deteriorated by the photocatalytic effect of titanium oxide. Moreover, the former had a problem in poor heat resistance because patterning by irradiation with a laser beam was based on carbonization. On the other hand, the latter using a low-melting glass binder had a problem that a large part of energy of the laser beam was spent in melting glass so that the color of titanium oxide was hardly changed with the result that sharp contrast could not be formed.

SUMMARY OF THE INVENTION

An object of the invention is to develop a laser beam writing material in which a pattern excellent in contrast can be formed by irradiation with a laser beam so that a display body excellent in heat resistance and weather resistance can be formed.

According to the invention, there is provided a laser beam writing material having: silicon dioxide; and a titanium-containing compound fixed with the silicon dioxide and capable of being changed in color by irradiation with a laser beam; wherein when a color-changed portion in the laser beam writing material is formed by irradiation with the laser beam and exposed to the air at 600° C. for 30 minutes, contrast between the color-changed portion and a color-unchanged portion in the laser beam writing material is not lower than 0.60. There is also provided a material for forming the laser beam writing material, having a mixture at least including the titanium-containing compound and an MQ resin. There is further provided a display body having the color-changed portion formed in the laser beam writing material by irradiation with the laser beam.

According to the invention, the color of the titanium-containing compound can be changed efficiently by irradiation with a laser beam so as to form a pattern or information excellent in contrast on the basis of the locus of irradiation with a laser beam. Accordingly, a display body excellent in heat resistance and weather resistance can be obtained.

DETAILED DESCRIPTION OF THE INVENTION

A laser beam writing material according to the invention has: silicon dioxide; and a titanium-containing compound fixed with the silicon dioxide and capable of being changed in color by irradiation with a laser beam; wherein when a color-changed portion in the laser beam writing material is formed by irradiation with the laser beam and exposed to the air at 600° C. for 30 minutes, contrast between the color-changed portion and a color-unchanged portion in the laser beam writing material is not lower than 0.60.

The laser beam writing material can be formed as a material in which a titanium-containing compound capable of being changed in color by irradiation with a laser beam is fixed with silicon dioxide. That is, the laser beam writing material can be formed as a material in which the titanium-containing compound is dispersively contained in a layer of silicon dioxide. The method for forming the laser beam writing material is not particularly limited. Any suitable method can be used.

Examples of the method include: a method of sintering a mixture of the titanium-containing compound and a silicone-based polymer such as an MQ resin which is formed into silicon dioxide by a sintering operation by heating; a method of sintering a mixture of a silica resinate and the titanium-containing compound; and a method of melting and cooling silicon dioxide after mixing fine power of the silicon dioxide and the titanium-containing compound.

The titanium-containing compound capable of being changed in color by irradiation with a laser beam is not particularly limited too. One suitable kind of titanium-containing compound may be used or two or more suitable kinds of titanium-containing compounds may be used. Particularly, there may be preferably used a titanium-containing compound which exhibits a color high in reflectance such as white, silver or yellow before irradiation with a laser beam and which is changed in color by irradiation with a laser beam so that it exhibits a color low in reflectance such as black or brown after irradiation with the laser beam.

Examples of the titanium-containing compound include: titanium oxides having various kinds of acid values such as titanium dioxide; titanates such as potassium titanate; and titanium-containing compounds such as nickel titan yellow and chrome titan yellow. Particularly, alkali titanate such as potassium titanate can be preferably used from the point of view of achieving high contrast. Incidentally, titanium dioxide may have a rutile structure, an anatase structure or another crystal structure.

The contents of the titanium-containing compound in the laser beam writing material can be decided suitably. From the point of view of formability of information by the color change, generally, the contents of the titanium-containing compound are selected to be in a range of from 1 to 95% by weight, particularly in a range of from 10 to 80% by weight, more particularly in a range of from 15 to 70% by weight. Incidentally, from the point of view of formability of color-change information by homogeneous dispersion of the titanium-containing compound, the particle size of the titanium-containing compound used is preferably selected to be not larger than 50 μm, more preferably not larger than 30 μm, further preferably in a range of from 0.05 to 20 μm. The particle size of the titanium-containing compound is, however, not limited thereto.

According to the purpose of use, the laser beam writing material can be used to have a suitable form in which a layer of the laser beam writing material is provided as a surface, such as a sheet form in which the shape of the laser beam writing material itself is retained; a reinforcement form in which the laser beam writing material is reinforced by textile cloth or unwoven fabric or by a porous base material; or a form in which the laser beam writing material is provided with an adhesive layer such as a pressure-sensitive adhesive layer. Accordingly, the laser beam writing material can be used in a form in which the laser beam writing material is attached to a surface of a commodity formed into any shape such as a grain, a rod, a sheet, or a container.

In this case, the laser beam writing material portion in the sheet or the laser beam writing material portion attached to the whole or part of the commodity is irradiated with a laser beam to thereby form a color-changed portion on the basis of the locus of irradiation with the laser beam to thereby obtain a display body in which a target pattern or the like is written.

Incidentally, the reinforcement form may be formed by a suitable method such as a method of attaching a laser beam writing material layer onto a reinforcing base material, a method of impregnating a reinforcing base material with the laser beam writing material, or a method of interposing a reinforcing base material in a laser beam writing material layer. The reinforcing base material may be made of a polymer such as polyester, polyimide, fluororesin or polyamide which vanishes when heated, or may be made of a material such as glass, ceramics or metal which does not vanish when heated. Hence, a suitable porous or non-porous material such as a resin coating layer, a resin film, textile, cloth, unwoven fabric, metal foil, or a net may be used as the reinforcing base material.

The attached layer of the laser beam writing material can be formed by a method having the steps of: preparing a laser beam writing material-forming material made of a paint, etc., containing an MQ resin and/or a silica resinate and the titanium-containing compound; applying the laser beam writing material-forming material on a surface of a subject of attachment by a suitable method such as coating; and heating the laser beam writing material-forming material, for example, at a temperature of not higher than 1,000° C., particularly at a temperature of from 200 to 800° C., more particularly at a temperature of from 300 to 600° C. to thereby sinter the laser beam writing material-forming material. Alternatively, the attached layer of the laser beam writing material can be formed by a method having the steps of: forming a form of a laser beam writing material from the laser beam writing material-forming material in accordance with the sheet form of the laser beam writing material for shape retention or the reinforcement form of the laser beam writing material; adhering the form of the laser beam writing material to a subject of attachment through an adhesive layer; and sintering the form of the laser beam writing material in the same manner as described above.

By the sintering step, the MQ resin and/or the silica resinate constituting the laser beam writing material-forming material is modified into silicon dioxide while the organic reinforcing base material, the adhesive layer, etc. vanish, so as to bring a result that the layer of the laser beam writing material is adhered to the subject of attachment while the titanium-containing compound is fixed with the silicon dioxide. Accordingly, when a heat-resistant material is used as the subject of attachment, there can be obtained a laser beam writing material in which a layer of the titanium-containing compound fixed with silicon dioxide, that is, a laser beam writing material layer is firmly adhered to a surface of the heat-resistant material.

The heat-resistant material may be the commodity as a final object to which the laser beam writing material is attached, or may be a support base material for forming a management label or the like. In the latter case, the heat-resistant material is attached to the commodity as a final object after or before required writing with a laser beam is performed on the management label.

Any suitable material such as various kinds of metals represented by iron, steel, nickel, and aluminum, glass or ceramics can be used as the heat-resistant material. It is, however, undesirable to use a metal-based heat-resistant material such as copper because a surface of the material is oxidized and deteriorated in the process of sintering so that a homogeneous sintered film is difficult to be obtained.

A known suitable material such as a tackifier of a silicone pressure-sensitive adhesive agent can be used as the MQ resin used for preparing the laser beam writing material-forming material. Particularly, from the point of view of the function of a binder, it is preferable to use an MQ resin made of a polymer having monofunctional M units represented by the general formula: $R_3SiO$—, and quadrifunctional Q units represented by the general formula: $Si(O—)_4$. Particularly preferred is an MQ resin which is excellent in shape-retaining force when it serves as a binder for retaining the titanium-containing compound in the sheet form.

Incidentally, in the general formula of the MQ resin, R may have a suitable structural unit such as an organic group or a hydrolyzable group. Examples of the organic group include: aliphatic hydrocarbon groups such as a methyl group, an ethyl group and a propyl group; aromatic hydrocarbon groups such as a phenyl group; and olefin groups such as a vinyl group. An example of the hydrolyzable group is a hydroxyl group.

On the other hand, any suitable material can be used as the silica resinate without any particular limitation if the material can form silica dioxide in the sintering step. Examples of the material of the silica resinate includes silica sol, alumina sol, antimony pentoxide sol, and zirconia sol.

To achieve high contrast by irradiation with a laser beam, the ratio of the titanium-containing compound used to the MQ resin and/or silica resinate used is preferably selected so that the amount of the titanium-containing compound used is in a range of from 1 to 500 parts by weight, particularly in a range of from 20 to 200 parts by weight, more particularly in a range of from 40 to 100 parts by weight based on 100 parts by weight of the MQ resin and/or silica resinate.

When the laser beam writing material-forming material is prepared, any suitable polymer or the like exhibiting a binder function, for example, for improvement in fixing force or shape-retaining force of the titanium-containing compound and improvement in flexibility may be mixed as occasion demands. Incidentally, silicone rubber can be preferably used for improvement in shape-retaining force and flexibility. Silicone rubber functions as a binder. Moreover, silicone rubber improves resistance to chemicals and forms silicon dioxide in the same manner as in the MQ resin in the sintering step.

A suitable material can be used as the silicone rubber without any particular limitation. Examples of the material of the silicone rubber include dimethyl siloxane, diphenyl siloxane, and methylphenyl siloxane. Various kinds of modified silicone rubber such as phenol-modified silicone rubber, melamine-modified silicone rubber, epoxy-modified silicone rubber, polyester-modified silicone rubber, acryl-modified silicone rubber and urethane-modified silicone rubber may be also used. The molecular weight of the silicone rubber is not particularly limited. From the point of view of flexibility donating characteristic in the case where the laser beam writing material-forming material is provided in the sheet form, the molecular weight of the silicone rubber is preferably selected to be in a range of from 10,000 to 2,000,000, more preferably in a range of from 20,000 to 1,500,000, further preferably in a range of from 50,000 to 1,000,000.

The amount of the silicone rubber used can be decided suitably in accordance with sintering strength, resistance to chemicals, and so on. From the point of view of sintering strength, generally, the amount of the silicone rubber used is selected to be not larger than 1,000 parts by weight, particularly in a range of from 3 to 500 parts by weight, more particularly in a range of from 5 to 200 parts by weight based on 100 parts by weight of the MQ resin and/or silica resinate.

Mixing various kinds of organic compounds such as polymers is also effective in improving flexibility and strength in the case where the laser beam writing material-forming material is provided in the sheet form. Examples of this type organic compound include hydrocarbon-based polymers, vinyl-based or styrene-based polymers, acetal-based polymers, butyral-based polymers, acrylic-based polymers, polyester-based polymers, urethane-based polymers, cellulose-based polymers, fibrin-based polymers, and various kinds of waxes. Particularly, cellulose-based polymers such as ethyl cellulose can be preferably used from the point of view of improvement in strength.

The amount of the organic compound used is not particularly limited. From the point of view of improvement in strength, generally, the amount of the organic compound used is selected to be not larger than 1,000 parts by weight, particularly in a range of from 5 to 500 parts by weight, more particularly in a range of from 10 to 200 parts by weight based on 100 parts by weight of the total amount of the MQ resin and/or silica resinate and the silicone rubber provided as occasion demands. Incidentally, the organic compound is decomposed so as to vanish in the process of sintering.

Incidentally, when the laser beam writing material-forming material is prepared, inorganic powder other than the titanium-containing compound may be mixed as occasion demands. For example, the inorganic powder is a white material such as silica, alumina, zinc oxide, calcium oxide, mica or aluminum borate. The inorganic powder may be mixed as a metal compound such as carbonate, nitrate or sulfate which can be formed into oxidized white ceramics when oxidized in the sintering step.

As the inorganic powder, one kind of material may be used or two or more kinds of materials may be used. The particle size of the inorganic powder can be selected in accordance with the particle size of the titanium-containing compound. In order to prevent the inorganic powder from inhibiting the color change of the titanium-containing compound by irradiation with a laser beam, generally, the amount of the inorganic powder used is selected to be not larger than 100% by weight, particularly not larger than 60% by weight, more particularly not larger than 30% by weight based on the amount of the titanium-containing compound.

For example, the laser beam writing material-forming material can be formed by a method having the steps of: mixing an MQ resin and/or a silica resinate and the titanium-containing compound and, if necessary, further mixing at least one kind of organic compound such as silicone rubber or ethyl cellulose and at least one kind of inorganic powder in a ball mill or the like, if necessary, by use of an organic solvent or the like; and spreading the mixture liquid on a target surface of a commodity for attachment and drying the mixture liquid by a suitable method.

Hence, for example, the laser beam writing material-forming material in the sheet form can be formed by a method in which the mixture liquid is spread on a reinforcing base material made of a heat-resistant material or a support material such as a separator and dried. The laser beam writing material-forming material formed on the separator may be transferred and adhered onto a target surface of a commodity for attachment through an adhesive layer provided on the laser beam writing material-forming material.

Incidentally, a suitable material can be used as the organic solvent provided in accordance with necessity. Examples of the organic solvent generally used include toluene, xylene, butyl carbitol, ethyl acetate, butyl cellosolve acetate, methyl ethyl ketone, and methyl isobutyl ketone. The mixture liquid is not limited but preferably prepared so that the solid concentration is in a range of from 5 to 85% by weight from the point of view of spreadability. When the mixture liquid is prepared, suitable additives such as a dispersant, a plasticizer, and a burning assistant may be mixed as occasion demands.

The mixture liquid is preferably spread by a method excellent in layer thickness controllability such as a doctor blade method or a rotogravure roll coater method. An anti-foaming agent may be preferably used together for performing an air-releasing treatment sufficiently so that air bubbles do not remain in the spread layer. The thickness of the laser beam writing material-forming material formed can be decided suitably but generally selected to be in a range of from 1 $\mu$m to 5 mm, particularly in a range of from 5 $\mu$m to 1 mm, more particularly in a range of from 10 to 200 $\mu$m.

The laser beam writing material-forming material may be provided in the porous form in accordance with necessity to smoothly volatilize decomposition gas generated in the sintering step. Incidentally, when the laser beam writing material-forming material is sintered while temporarily adhered through an organic adhesive layer, the laser beam writing material formed may be inflated with decomposition gas. If the laser beam writing material-forming material is provided in the porous sheet form, the laser beam writing material can be prevented from being inflated with decomposition gas.

The porous laser beam writing material-forming material can be formed by a suitable method such as a method of forming a large number of fine holes in the laser beam writing material-forming material provided in the sheet form or the like by punching or the like, or a method using woven or unwoven fabric or a metal foil, net or the like having a large number of fine holes formed therein as the reinforcing base material.

An adhesive layer may be provided on the laser beam writing material-forming material in accordance with necessity so that the laser beam writing material-forming material can be temporarily adhered to a subject of attachment such as a commodity before the sintering step. A suitable adhesive agent can be used for forming the adhesive layer. Particularly, a pressure-sensitive adhesive layer is preferably used from the point of view of facilitating the workability of adhering. Any suitable pressure-sensitive adhesive agent can be used for forming the pressure-sensitive adhesive layer without any particular limitation. Examples of the pressure-sensitive adhesive agent include a rubber-based pressure-sensitive adhesive agent, an acrylic-based pressure-sensitive adhesive agent, a silicone-based pressure-sensitive adhesive agent, a vinyl alkyl ether-based pressure-sensitive adhesive agent, a polyvinyl alcohol-based pressure-sensitive adhesive agent, a polyvinyl pyrolidone-based pressure-sensitive adhesive agent, a polyacrylamide-based pressure-sensitive adhesive agent, and a cellulose-based pressure-sensitive adhesive agent.

A water-soluble pressure-sensitive adhesive layer may be provided for temporarily adhering the laser beam writing material-forming material to a subject of attachment which is a wet commodity such as unglazed ceramics before baking or a commodity on which dewdrops form easily. A suitable pressure-sensitive adhesive substance such as a pressure-sensitive adhesive agent using a water-soluble or hydrophilic polymer can be used for forming the adhesive layer. Examples of the water-soluble or hydrophilic polymer include a methoxyethyl acrylate-based polymer, a vinyl alcohol-based polymer, a vinyl pyrolidone-based polymer, an acrylamide-based polymer, an acrylic acid copolymer, a vinyl methyl ether-based polymer, and a cellulose-based polymer.

The adhesive layer such as a pressure-sensitive adhesive layer can be formed by a suitable method such as a method of applying an adhesive agent on the laser beam writing material-forming material of the sheet form or the like by a suitable coating method such as a doctor blade method or a rotogravure roll coater method, or a method in which an adhesive layer provided on a separator in the aforementioned manner is transferred onto the laser beam writing material-forming material. The adhesive layer may be provided so as to be scattered so that decomposition gas can be volatilized smoothly when the laser beam writing material-forming material is sintered. The scattered adhesive layer can be formed by a coating method such as a rotary screen method.

The thickness of the adhesive layer can be decided in accordance with the subject of attachment, the purpose of use, etc. Generally, the thickness of the adhesive layer is selected to be in a range of from 1 to 500 $\mu$m, particularly in a range of from 5 to 200 $\mu$m. Incidentally, the pressure-sensitive adhesive layer may be preferably covered with a separator or the like before the laser beam writing material-forming material is temporarily adhered to the subject of attachment through the pressure-sensitive adhesive layer so that contamination can be prevented.

The laser beam writing material-forming material can be preferably used for the application in which the laser beam writing material-forming material can be temporarily adhered well to a curved portion or the like of a subject of attachment through an adhesive layer or the like as occasion demands so that a sintered body obtained by heating the laser beam writing material-forming material is adhered to a subject of attachment. An automatic adhering method using a robot or the like may be used for temporarily adhering the laser beam writing material-forming material to a subject of attachment. The laser beam writing material-forming material can be used in a suitable form such as a sheet form or a punched form.

The laser beam writing material-forming material temporarily adhered to a subject of attachment can be sintered in a suitable heating condition in accordance with the heat resistance or the like of the subject of attachment. Generally, the temperature used for heating is selected to be not higher than 800° C., particularly in a range of from 200 to 650° C., more particularly in a range of from 250 to 550° C. By the heating treatment, the MQ resin and/or silica resinate constituting the laser beam writing material-forming material and the silicone rubber provided in accordance with necessity are sintered into silicon dioxide while the organic component such as the adhesive layer vanishes, so that the laser beam writing material formed is adhered to the subject of attachment.

When the laser beam writing material adhered to the subject of attachment is irradiated with a laser beam, the color of the titanium-containing compound can be changed in accordance with the locus of irradiation with the laser beam. As a result, target information, pattern or the like can be written on the basis of the color change of the titanium-containing compound. The information, pattern or the like to be written is optional and examples thereof include print information, pictorial pattern, bar code pattern, and the like.

When the laser beam writing material is exposed to the air at 600° C. for 30 minutes after the color-changed portion is formed by irradiation with a laser beam, contrast between the color-changed portion and a color-unchanged portion (background color portion) is not lower than 0.60. The contrast is defined as (reflectance of the color-unchanged portion—reflectance of the color-changed portion)/(reflectance of the color-unchanged portion). The preferred contrast is not lower than 0.65, particularly not lower than 0.70, more particularly not lower than 0.75 on the basis of visible light, particularly light in a wavelength range of from 500 to 700 nm, when the laser beam writing material is exposed to the air at 600° C. for 1 to 2 hours, particularly for 2 hours.

As described above, the laser beam writing material can be preferably used for forming an identification label such as a management label having any kind of identification pattern such as bar code pattern because information or the like excellent in contrast can be formed in the laser beam writing material. In this case, a laser beam writing material using a titanium-containing compound whose color can be changed to black or a deep color relative to the white background color based on the titanium-containing compound or the like by irradiation with a laser beam can be preferably used to achieve high contrast or the like.

Because target information, pattern or the like can be written in the laser beam writing material by irradiation with a laser beam, various kinds of writing can be performed as occasion demands and writing can be added at any time. Hence, the laser beam writing material can be used as, for example, a management label of the type in which necessary information is added in any step in a production line.

Incidentally, any suitable laser can be used as the laser for writing without particular limitation. Examples of the laser include a solid laser, a liquid laser, a gas laser, an ion laser, a semiconductor laser, a ruby laser, an He-Ne laser, a nitrogen laser, a chelate laser, a dye laser, a glass laser, and a YAG laser. A laser excellent in color-changing efficiency of the titanium-containing compound such as a carbon dioxide gas laser can be preferably used.

The laser beam writing material-forming material and the laser beam writing material according to the invention can be preferably used for various purposes such as painting on a subject of attachment as a commodity, coloring thereof, and donating an identification mark such as color-based identification information or a bar code. Examples of the commodity include china, glassware, ceramics, metal products, and enamel products. The subject of attachment may have any suitable form such as a planar form or a curved form represented by a container or the like.

Next, the present invention will be described in greater detail by reference to the following Examples. However, it is to be understood that the invention is not construed as being limited thereto.

EXAMPLE 1

In toluene, 130 parts (by weight, the same omission will apply hereunder) of MQ resin (made by Shin-Etsu Chemical Co., Ltd.), 30 parts of silicone rubber with molecular weight of 300,000 (made by Shin-Etsu Chemical Co., Ltd.), 80 parts of potassium titanate (made by Otsuka Chemical Co., Ltd.) and 60 parts of ethyl cellulose (made by Hercules Inc.) were mixed homogeneously to thereby obtain a dispersion liquid. The obtained dispersion liquid was applied on a 75 μm-thick polyester film by a doctor blade method and dried to form a 60 μm-thick layer for forming a laser beam writing material. Thus, a material for forming a laser beam writing material in a sheet form was obtained.

On the other hand, a toluene solution containing 100 parts of polybutyl acrylate with molecular weight of 1,000,000 was applied onto a separator made of a 70 μm-thick sheet of glassine paper treated with a silicone-based releasing agent, by a doctor blade method and dried to form a 20 μm-thick pressure-sensitive adhesive layer. The separator having the pressure-sensitive adhesive layer was adhered to a surface of the material for forming a laser beam writing material through the pressure-sensitive adhesive layer. After the polyester film and the separator were peeled off, the material for forming a laser beam writing material was adhered to an aluminum alloy plate through the pressure-sensitive adhesive layer and the aluminum alloy plate having adhered thereto the material for forming a laser beam writing material was heated at 500° C. for 30 minutes so as to be sintered. Thus, a laser beam writing material which was white was formed.

EXAMPLE 2

A material for forming a laser beam writing material and a laser beam writing material were obtained in the same manner as in Example 1 except that the potassium titanate was replaced by rutile titanium oxide.

EXAMPLE 3

In toluene, MQ resin, silicone rubber, potassium titanate and ethyl cellulose were mixed homogeneously to thereby prepare a dispersion liquid in the same manner as in Example 1. The dispersion liquid was applied onto a predetermined portion of an aluminum alloy plate. After dried, the dispersion liquid-applied aluminum alloy plate was heated at 500° C. for 30 minutes so as to be sintered. Thus, a laser beam writing material which was white was formed.

EXAMPLE 4

A material for forming a laser beam writing material and a laser beam writing material were obtained in the same manner as in Example 1 except that the MQ resin and the silicone rubber were replaced by 130 parts of silica sol (Snowtex, made by Nissan Chemical Industries, Ltd.) as silica resinate.

COMPARATIVE EXAMPLE 1

A material for forming a laser beam writing material and a laser beam writing material were obtained in the same manner as in Example 1 except that the potassium titanate was replaced by talc.

COMPARATIVE EXAMPLE 2

A material for forming a laser beam writing material and a laser beam writing material were obtained in the same manner as in Example 1 except that the MQ resin was replaced by lead glass having a melting point of 470° C.

COMPARATIVE EXAMPLE 3

A toluene solution containing 100 parts of titanium oxide-coated mica powder (Pearl Glaze MM100, made by Nihon Kouken Kogyo Co., Ltd.) and 50 parts of silicone varnish (KR255, made by Shin-Etsu Chemical Co., Ltd.) was applied onto an aluminum alloy plate. After dried, the toluene solution-applied aluminum alloy plate was baked at 300° C. for 1 hour. Thus, a laser beam writing material was obtained.

<Evaluation Test>

The laser beam writing material obtained in each of Examples and Comparative Examples was irradiated with a carbon dioxide gas laser beam to perform predetermined marking. The laser beam writing material was heated in the air at 600° C. for 2 hours. Contrast between the color-changed portion and the color-unchanged portion in the laser beam writing material was measured before and after the heating. Results of the measurement were as shown in the following table. Incidentally, the reflectance for calculating the contrast was measured on the basis of light at a wavelength of 633 nm by use of RJS AutoScan II.

| | Example | | | | Comparative Example | | |
|---|---|---|---|---|---|---|---|
| | 1 | 2 | 3 | 4 | 1 | 2 | 3 |
| Before heating | 0.90 | 0.75 | 0.90 | 0.85 | 0.55 | 0.50 | 0.80 |
| After heating | 0.85 | 0.73 | 0.85 | 0.80 | 0.55 | 0.50 | 0.55 |

While the invention has been described in detail and with reference to specific embodiments thereof, it will be apparent to one skilled in the art that various changes and modifications can be made therein without departing from the spirit and scope thereof.

What is claimed is:

1. A display body, comprising:

a color-changed portion formed by irradiation with a laser beam in a laser beam writing material, comprising:

silicon dioxide; and a titanium-containing compound fixed with said silicon dioxide and capable of being changed in color by irradiation with a laser beam;

wherein said titanium-containing compound has been fixed with said silicon dioxide by sintering; and wherein when the color-changed portion in said laser beam writing material is exposed to the air at 600° C. for 30 minutes, contrast between said color-changed portion and a color-unchanged portion in said laser beam writing material is not lower than 0.60.

2. The display body according to claim 1, wherein said titanium-containing compound has been fixed with said silicon dioxide by sintering at a temperature of not higher than 1,000° C.

3. The display body according to claim 1, wherein said titanium-containing compound has been fixed with said silicon dioxide by sintering at a temperature of from 200 to 800° C.

4. The display body according to claim 1, wherein said titanium-containing compound has been fixed with said silicon dioxide by sintering at a temperature of from 300 to 600° C.

5. The display body according to claim 1, wherein said titanium-containing compound is potassium titanate.

6. The display body according to claim 1, wherein a layer comprising said silicon dioxide and said titanium-containing compound is provided on a surface of a heat-resistant material.

7. The display body according to claim 1, wherein the laser beam writing material further comprises:

a mixture comprising an MQ resin and the titanium-containing compound capable of being changed in color by irradiation with a laser beam.

8. The display body according to claim 6, wherein the laser beam writing material:

further comprises a mixture comprising an MQ resin and the titanium-containing compound capable of being changed in color by irradiation with a laser beam, and is applied onto a surface of said heat-resistant material and sintered.

* * * * *